United States Patent [19]

Tuval et al.

[11] Patent Number: 4,491,367
[45] Date of Patent: Jan. 1, 1985

[54] METHOD FOR SUBTERRANEAN GENERATION OF HEAT AS A SOURCE OF ENERGY

[76] Inventors: Miron Tuval, 21 Ezion St., Ramat Gan 52 383; Emanuel Azmon, 16 Oren St., Omer; Avraham Melamed, 31 Haoranim St., Kfar Shmaryahu 45 263, all of Israel

[21] Appl. No.: 405,305

[22] Filed: Aug. 4, 1982

[30] Foreign Application Priority Data

Aug. 18, 1981 [IL] Israel ......................... 63602

[51] Int. Cl.$^3$ ..................... E21B 43/24; E21B 43/28
[52] U.S. Cl. ..................... 299/4; 60/641.2; 165/45; 175/12
[58] Field of Search ............ 299/2, 4, 5, 14; 175/12, 64; 166/256; 165/45; 60/641.1, 641.2

[56] References Cited

U.S. PATENT DOCUMENTS

| | | | |
|---|---|---|---|
| 3,421,794 | 1/1969 | Jacoby | 299/5 |
| 3,640,336 | 2/1972 | Dixon | 165/45 X |
| 3,864,208 | 2/1975 | Van Huisen | 60/641.2 X |
| 4,018,279 | 4/1977 | Reynolds et al. | 60/641.2 X |
| 4,065,183 | 12/1977 | Hill et al. | 299/4 |
| 4,127,989 | 12/1978 | Mickelson | 165/45 X |

*Primary Examiner*—Ernest R. Purser
*Attorney, Agent, or Firm*—Steinberg & Raskin

[57] ABSTRACT

Subterranean generation of heat as a source of energy optionally accompanied by the production of minerals. In subterranean formations of minerals that are capable of undergoing an enthalpic degradation, such degradation is artificially accelerated by several orders of magnitude. To this end a bore hole is drilled down to the desired formation and accelerated enthalpic degradation is made to occur by a suitable ignition. For the extraction of energy the bore hole is flushed with water and the resulting steam is withdrawn. In one embodiment, one and the same bore hole is used for charging water and withdrawing steam. In another embodiment the bore holes are arranged pairwise, one bore hole of each pair serving for ignition and introduction of water and the other serves for the withdrawal of steam.

After the formation has cooled down to the point where steam is no longer generated to any significant extent it is possible to continue with flushing and subjecting the reemerging aqueous phase to an operation or sequence of operations for the recovery of minerals therefrom.

9 Claims, 3 Drawing Figures

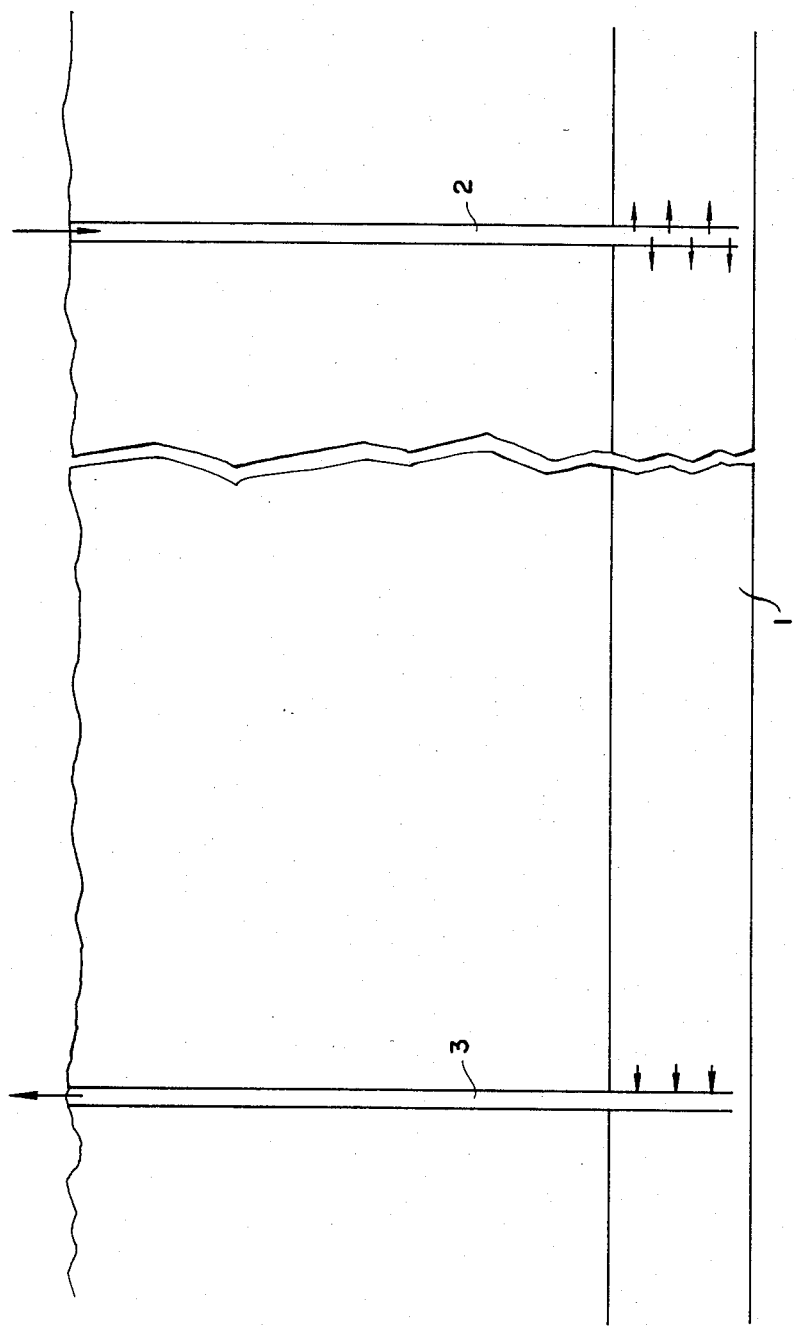

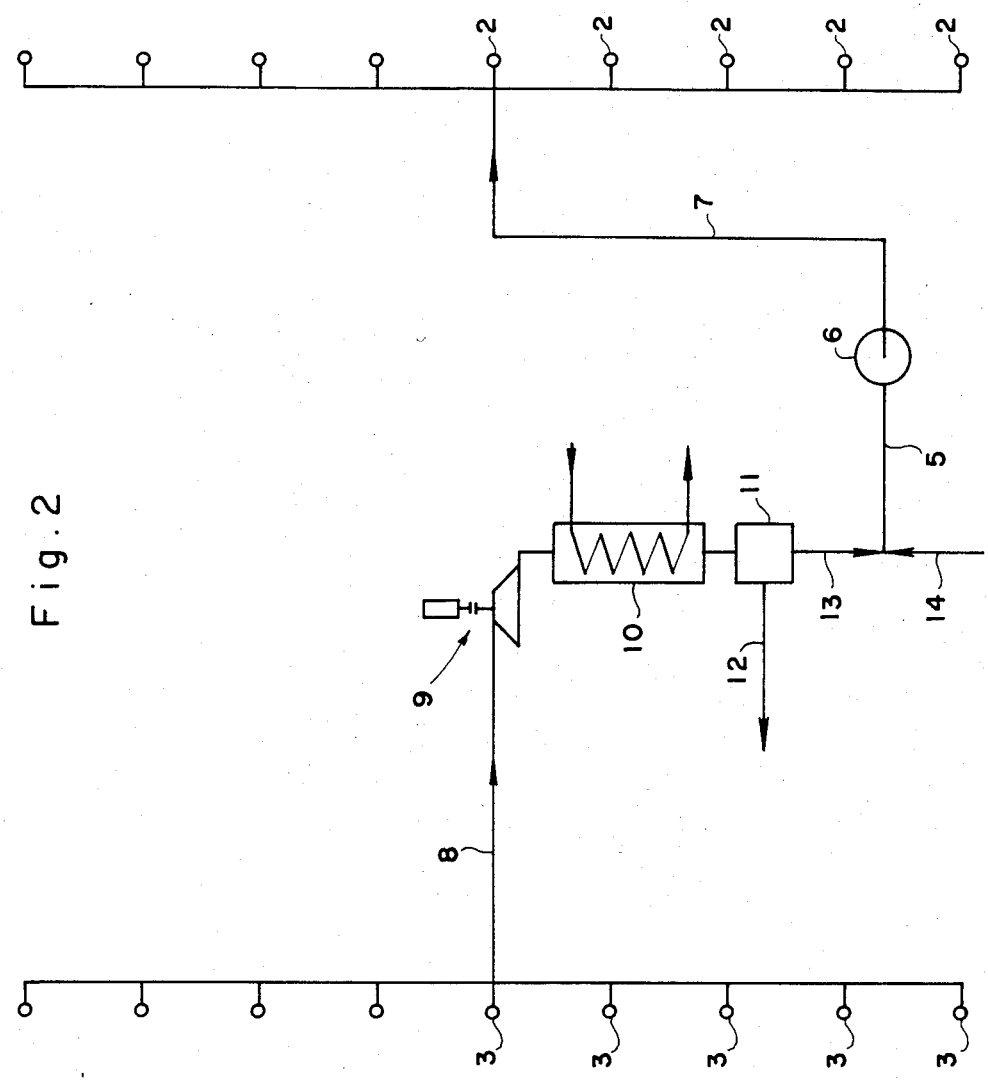

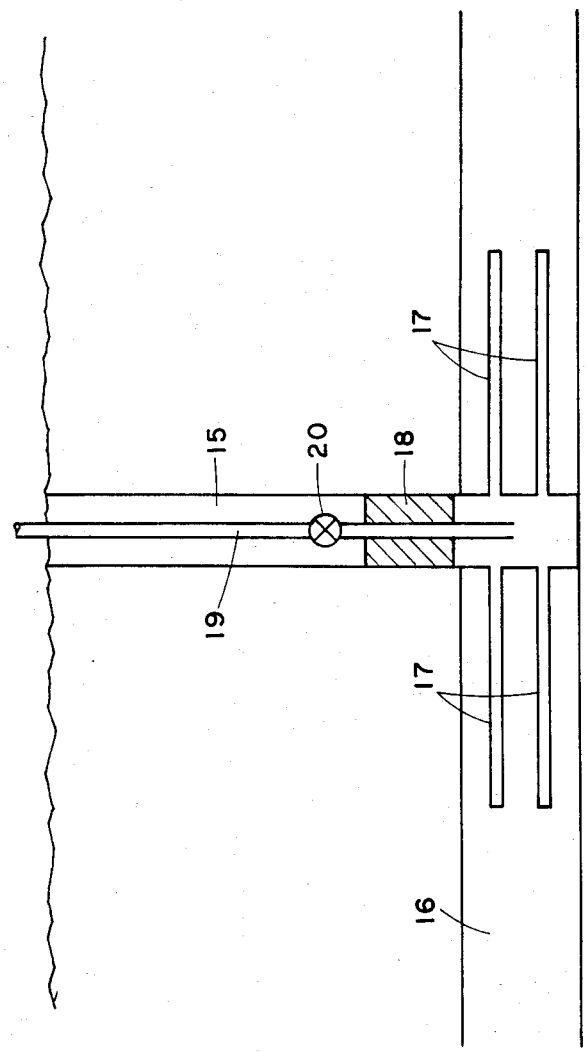

METHOD FOR SUBTERRANEAN GENERATION OF HEAT AS A SOURCE OF ENERGY

BACKGROUND OF THE INVENTION

The present invention concerns a novel method for the generation of heat as a source of useful energy. The invention further concerns the recovery of minerals formed or set free in the course of such heat generation.

Heat as a source of energy is conventionally generated (as distinct from its recovery from natural sources) by combustion of carbon, e.g. coal, or carbon compounds such as mineral oil or mineral gas. Another, by now conventional method of heat generation for energy production is controlled nuclear fission in atomic reactors.

Coal, crude oil and gas are only available in certain restricted areas and their supply to consumers in other regions is not only becoming ever more expensive but is also ever more loaded with political considerations. Similar problems apply to atomic energy, which in addition is also considered hazardous.

SUMMARY OF THE INVENTION

It is therefore the object of the present invention to provide a new method of artifical heat generation that makes use of universally available materials. It is a further object of the present invention to recover minerals that are formed or set free in the course of such artificial heat generation.

It has been known for a long time that natural inorganic minerals undergo gradual changes known as weathering. Weathering is a series of complex operations that involve five distinct processes known as: disintegration, oxidation, hydration, chemical reaction (of solutions with gases or with other solutions, and of gases with solids) and evaporation.

Minerals are the products of their environments. They are for the most part stable under the conditions under which they originated but become unstable with changing environment. When viewed from a thermodynamic point of view it may be said that each mineral occurring in nature has a given enthalpy, and upon weathering the enthalpy decreases with a liberation of some of the enthalpy in the form of sensible heat. One can thus refer quite generally to the weathering processes as enthalpic degradation.

Spontaneous enthalpic degradation is an extremely slow process regardless of the nature of the mineral and the specific nature of the weathering. In according with the present invention it has now been realized that enthalpic degradation processes can artifically be accelerated by an order of $10^7$ to $10^8$, with the liberation of large amounts of heat which can be usefully exploited.

While in theory any enthalpic degradation can be accelerated with the liberation of certain quantities of energy, from a practical point of view it has been realized in accordance with the invention that particularly good results are obtained by carrying out the enthalpic degradation in subterranean formations which may be several kilometers deep. It has further been realized in accordance with the present invention that from a practical point of view the formation that can be subjected to enthalpic degradation in accordance with the present invention should comprise a calcareous rock, e.g. calcium carbonate, in admixture with one or more silicate minerals corresponding to the following general formula:

$$kM^1_qO_r \cdot lM^2_sO_t \cdot mXiO_2 \cdot nH_2O \qquad \text{I}$$

where $M^1$ and $M^2$ stand each for a metal, each of k, l, m, n, q, r, s, t is an integer of 1 to 10 and any one of k, l and n may also be zero.

In order to bring about an accelerated enthalpic degradation in a subterranean formation in accordance with the present invention, the reaction has to be initiated. For this purpose, some heat has to be invested. Such initiation may be done by any known method that affords the required initiation temperature, e.g. by bringing about a subterranean explosion, igniting a flame subterraneously, etc.

Once an accelerated enthalpic degradation is initiated in a subterranean formation in accordance with the invention, the degradation becomes self-sustaining and proceeds as long as a degradable mineral remains in the particular formation. In practical terms this means that the enthalpic degradation will gradually progress in the geological formation, with a gradual transformation of the mineral present there into a different modification of the same mineral of lower enthalpy or into a different mineral of lower enthalpy, and with the liberation of sensible heat. This transformation may be accompanied by the conversion of the originally compact and impermeable subterranean formation into a porous structure. The sensible heat liberated by said transformation is stored in the subterranean formation in which the enthalpic degradation occurs, and can be recovered by injecting water into the geological formation in which the enthalpic degradation reaction occurs. The water serves as heat carrier fluid and is converted into steam which is extracted from the geological formation in which sensible heat can be recovered and be utilized as useful energy.

As a result of the above accelerated enthalpic degradation reaction certain minerals may be subjected to various conversions such as decomposition and double decomposition reactions. For example, native, water insoluble minerals such as potassium silicate, may be converted into water soluble ones, e.g. potassium carbonate, or else into minerals that are readily suspendible in water. Moreover, the enthalpic degradation reaction may set free and disintegrate minerals that in their native form were inaccessible, and in this way such minerals become accessible to extraction or washing out with water.

Where it is desired to gain any such minerals the water flushing of the rock formation in which the enthalpic degradation reaction has taken place is continued after the formation has cooled down sufficiently for flushing water to reemerge in liquid phase, e.g. in form of an aqueous slurry or solution, and minerals may be recovered therefrom by methods known per se.

In accordance with the invention use is made of bore holes or shafts leading from the surface into a suitable geological formation. In the following specification and claims any such bore hole or shaft will be referred to as 37 bore hole" regardless of its width. Use may also be made in accordance with the invention of horizontal bore holes or galleries branching off from an essentially vertical bore hole. These bore holes or galleries will be referred to herein as "horizontal bore holes" regardless of their width or height.

Based on all the above observations the present invention provides a method for the generation and recovery of heat as a source of useful energy comprising locating a subterranean formation of a calcareous rock in admixture with one or more silicate minerals capable of undergoing an accelerated enthalpic degradation, boring at least one bore hole leading into said formation, inducing the initiation of a self-sustaining accelerated enthalpic degradation reaction in the bore hole, flushing the bore hole with water, capturing steam emerging from the bore hole and recovering sensible heat therefrom.

The above energy generating process is continued for as long as steam emerges from the bore hole. After some time the bore hole cools down to a point where the water charged therein no longer evaporates. If desired, it is possible in accordance with the invention to continue the flushing of the bore hole with water with a view of recovering therefrom minerals formed and/or set free during the enthalpic degradation reaction. To this end an aqueous phase slurry or solution of minerals is regained from the bore hole and the subjected to any operation or sequence of operations known per se for the recovery of minerals therefrom.

In accordance with one embodiment of the invention one single bore hole is used. In such an embodiment it is possible to increase the amount of energy generated and the amount of minerals recovered by drilling a number of horizontal bore holes extending radially from a vertical bore hole. However, even so the amount of energy generated in this way is limited. Therefore where large quantities of energy are required a modification of the invention is used which comprises:

(i) locating a subterranean formation of a calcareous rock in admixture with one or more silicate minerals capable of undergoing an accelerated enthalpic degradation;

(ii) boring at least one bore hole leading into said formation (first bore holes(s));

(iii) boring at least one further bore hole (second bore holes(s)) at a distance from said first bore hole(s);

(iv) inducing the initiation of a self-sustaining accelerated enthalpic degradation via said first bore hole(s);

(v) allowing the accelerated enthalpic degradation reaction to proceed until it reaches said second bore hole(s);

(vi) flushing said first bore hole(s) with water so as to cause the water to flow towards said second bore hole(s) and to emerge therefrom in the form of steam; and (vii) recovering sensible heat from the steam emerging from said second bore hole(s).

Where it is desired to recover minerals formed and/or set free during the enthalpic degradation reaction it is possible in accordance with the above embodiment of the invention to proceed by either of two methods or a combination thereof. By one method some of the water charged into a first bore hole is pumped out therefrom in form of an aqueous solution or slurry of minerals as soon as the vicinity of the bore hole has sufficiently cooled down.

By another method water is continuously charged into the first bore hole(s) until no more steam is generated and an aqueous solution or slurry of minerals emerges from the second bore hole(s).

It is also possible to combine the two methods in that during a first phase an aqueous solution or slurry is pumped out from the first bore hole(s) until an aqueous phase begins to emerge also from the second bore hole(s), at which time the withdrawal of aqueous phase from the first bore hole(s) may be discontinued.

An aqueous phase recovered by any of these methods is subjected to any operation or sequence of operations known per se from the minerals recovered therefrom.

Initiation of the enthalpic degradation reaction via said first bore hole(s) may involve the introduction of reactants, such as $CO_2$ and water, which are formed in situ when the reaction becomes self-sustaining, but which are not available initially; it also involves the introduction of means for the ignition of a reaction, e.g., a detonator or an electric sparking device, and the like.

The water which serves as a heat carrier fluid can have any desired degree of salinity depending on what is available. As a rule, the temperatures that are generated in the subterranean formation by the enthalpic degradation will be of the order of at least 800° C., and in many occasions will be much higher. In consequence, the water, on its way, undergoes phase transformation, being converted into superheated steam. Moreover, some of the steam may decompose on its way, with the formation of oxygen and hydrogen. Where this happens, the oxygen will be used up, in oxidation reactions, while hydrogen will be contained in the steam emerging from said second bore hole(s) and may be recovered separately. Any hydrogen recovered in this way is in itself a valuable source of energy.

The water, aside from serving as a heat and mineral carrier, may also, if under high pressure, participated in chemical reactions associated with the accelerated enthalpic degradation of the rock.

Silicate minerals capable of undergoing an accelerated enthalpic degradation are listed below by way of non-limiting examples.

| Clays: | |
|---|---|
| kandites | $Al_2O_3 \cdot 2SiO_2 \cdot 2H_2O$ |
| illites | $K_yAl_4(Si_{8-y},Al_y)O_{20}(OH)_4$ where $y < 2$ |
| smectites | $Na_{0.7}(Al_{3.3}MgO_{0.7})Si_8O_{20}(OH)_4 \cdot nH_2O$ |
| vermiculites | $(Mg,Ca)_{0.7}(Mg,Fe^{+3},Al)hd\ 6.0(Al,Si)_{8.0}O_{20}(OH)_4 \cdot 8H_2O$ |
| Feldspars: | |
| adularia | $KAlSi_3O_8$ |
| sandine | $KAlSi_3O_8$ |
| microline | $KAlSi_3O_8$ |
| albite | $NaAlSi_3O_8$ |
| anorthite | $CaAlSi_3O_8$ |
| Garnets: | |
| grossularite | $Ca_3Al_2(SiO_4)_3$ |
| andradite | $Ca_3Fe_2(SiO_4)_3$ |

Preferred silicate formations that are suitable for accelerated enthalpic degradation in accordance with the present invention are aluminosilicates corresponding to the general formula:

$$kM_2^3O \cdot Al_2O_3 \cdot mSiO_2\ eH_2O \qquad \text{II}$$

where k and m are as in formula I and $M^3$ is monovalent metal and where e is an integer from 1 to 10.

The accelerated enthalpic degradation reaction induced to occur in accordance with the invention consumes $CO_2$. If necessary, the initial amount of $CO_2$ required for the initiation of the reaction may be supplied via said first bore hole(s). As the reaction becomes self-sustaining, any additional amounts of $CO_2$ are delivered by the disintegration of the calcareous rock due to the heat of reaction.

Taking for example the case of a mixture of $CaCO_3$ and an aluminosilicate of the above formula II, the reactions after ignition can be represented as follows:

$$CaCO_3 \xrightarrow{heat} CaO + CO_2 \quad (1)$$

$$nM_2O.Al_2O_3.mSiO_2.nH_2O + nCO_2 \longrightarrow \quad (2)$$
$$nMCO_3 + H_4Al_2Si_2O_9 + 4SiO_2 + heat$$

$$H_4Al_2Si_2O_9 \text{ (unstable)} \longrightarrow 2H_2 + O_2 + Al_2O_3 + SiO_2 \quad (3)$$

In some cases, water also takes part in the reaction. Any water required for heat-initiated thermal rock decomposition may become available by injection via said first bore hole(s).

The following example illustrates such a reaction:

$$K_2Al_2Si_6O_{16} + 2H_2O + CO_2 \xrightarrow{pH = 3-9} H_4Al_2O_9Si_2 + \quad (4)$$
$$4SiO_2 + K_2CO_3 + 300 \text{ Kcal/kg}^{-1}.$$

The $H_4Al_2O_9Si_2$ product is unstable and stabilizes after further reactions.

Taking a hypothetical rock formation at a depth of 3 kilometers, having a thickness of 20 meter and a bulk density of 3, every m² will represent 60 tons of rock material. having realized 230 Kcal/kg rock (and a possible additional 70 Kcal/kg rock as hydrogen gas) one gets:

$$230 \frac{Kcal}{kg} \times 60,000 \frac{kg}{m^2} = 13.8 \times 10^6 \frac{Kcal}{m^2}$$

This energy is equivalent to fuel oil as follows:

$$\frac{13.8 \times 10^6 \text{ Kcal/m}^2}{9.6 \times 10^3 \text{ Kcal/kg}} = 1.44 \times 10^3 \frac{Kg}{m^2} \text{ or } 1.44 \times 10^8 \frac{ton}{Km^2}$$

Assuming a recovery of only 50 percent, one gets:

$$6.9 \times 10^{12} \text{ Kcal/Km}^2 \text{ or } 0.72 \times 10^6 \text{ tons oil equivalent/Km}^2$$

It can be calculated that recovery of that energy over an area of 12 Km² using 500 cubic meters of water/hour, over a period of 6000 hours/year, at steam enthalpy of 900 Kcal/Kg, can supply that energy (at 50 percent recovery) for 30 years. This would be equal to 167 megawatt (electrical) (based on 2700 Kcal/KWh).

BRIEF DESCRIPTION OF THE DRAWINGS

The invention is illustrated, by way of example only, in the accompanying drawings in which:

FIG. 1 is a diagrammatic cross-section through a geological formation, fitted with a first and second bore hole in accordance with the invention;

FIG. 2 is a flow diagram showing a schematic realization of the invention; and

FIG. 3 is a diagrammatic illustration of another embodiment.

In FIG. 1, 1 is the geological formation selected for the performance of an enthalpic degradation reaction, e.g. of the type discussed hereinbefore. 2 is a first bore hole and 3 is a second bore hole. To start the reaction, ignition means are introduced into the formation via bore hole 2. Upon ignition, the enthalpic degradation reaction becomes self-sustaining and progresses from bore hole 2 to bore hole 3, leaving in its wake a hot porous layer suitable for the passage of water therethrough. When the reaction has reached the zone of bore hole 3 and thereby a passage between the bore holes has been created, pressurized water is injected through the bore hole 2 and is converted into high pressure steam in formation 1. The high pressure steam is withdrawn through bore hole 3, possibly in admixture with some hydrogen resulting from the thermal decomposition of water. Any hydrogen in the withdrawn steam may be separated and used as a separate source of energy. The steam is allowed to expand and thereby operate a mechanical device, e.g. a turbogenerator, and is then subjected to heat exchange for the recovery of sensible heat and latent heat of condensation therefrom, and the so-recovered heat is utilized as such or converted into other forms of useful energy by any known process.

After a certain quantity of water has been injected into the first bore hole 2 and steam recovered from the second bore hole 3, the rock formation in which an accelerated enthalphic degradation reaction has taken place cools down. At such a time an aqueous phase emerges from the second bore hole 3 containing dissolved and/or suspended minerals produced by the said reaction, e.g. potassium carbonate. Such minerals may be separated from the aqueous phase by methods known per se.

DETAILED DESCRIPTION OF PREFERRED EMBODIMENTS

FIG. 2 is a flow diagram of the surface operation. As shown, there is provided a series of first bore holes 2 and of second bore holes 3. The first and second bore holes may be arranged pairwise so that there is a matching second bore hole 3 for each first bore hole 2. Each matching pair of bore holes is connected with the operational elements as will be explained hereafter and several pairs of bore holes may be operational simultaneously or successively.

Water arriving through line 5 is pumped under pressure by means of a pressure pump 6 via line 7 into an operational first bore hole 2. The pressurized water penetrates into formation 1 (see FIG. 1) and is converted there into high-pressure steam. The pressurized steam picks up heat on its way and emerges superheated and pressurized through the matching second bore hole 3 from where it is channeled through a line 8 into a turbogenerator 9. The exhaust steam discharged from the turbogenerator 9 is piped into a condenser 10 and the water emerging therefrom is charged into a separator 11 for the separation of hydrogen gas. The hydrogen is removed through line 12 to a hydrogen container (not shown), while the remaining water is returned via line 13 to line 5 whereby the cycle is completed. The required make-up water is injected into the system via line 14. The heat taken up by the cooling water can be utilized in any suitable way.

Where the operation serves predominantly for the generation of energy, bore holes 2 and 3 are preferably at a relatively great distance apart. In this way the amount of heat stored in the passage between bore holes 2 and 3 are substantial and can be extracted for months or even years before the heat is exhausted.

The various pairs of bore holes 2, 3 may be operated successively or simultaneously, as may be required.

Where the operation serves primarily for the recovery of minerals, bore holes 2 and 3 are preferably drilled relatively close to each other. In this way the rock formations having undergone an enthalpic degradation reaction cools down relatively fast and an aqueous phase containing minerals can thus soon be withdrawn from the second bore hole.

Some of the water injected into a first bore hole may also be pumped out from the same bore hole to yield a mineral bearing aqueous phase.

The embodiment of the invention shown in FIG. 3 is a one-hole operation. It comprises a vertical bore hole 15 drilled down into a rock formation 16 in which an accelerated enthalpic degration reaction is to take place. A plurality of horizontal bore holes 17 extend radially from bore hole 15. A block 18, for example cast of concrete, forms a barrier impervious to fluids. A pipe 19 penetrates through block 18 down into formation 16. Pipe 19 serves for the injection of water into the bottom region of bore hole 15 and the channels 17, and also for the withdrawal of an aqueous phase therefrom. A valve 20 serves for controlling the flow of liquid through pipe 19. Materials required for initiation of an accelerated enthalpic degradation reaction are introduced into the bottom region of bore hole 15, either via pipe 19 or else prior to the insertion of block 18 and pipe 19, and the reaction is initiated as in the previous embodiment.

After the reaction has taken place water is injected into bore hole 15 by a pipe 19 and a mineral bearing aqueous phase is withdrawn through pipe 19 by pumping means (not shown).

It is also possible in accordance with the invention to have periods of energy generation alternate with periods of mineral recovery. To this end it is possible to discontinue a mineral gaining operation which proceeds as specified hereinbefore, to rekindle an accelerated enthalpic degradation reaction whereby a new energy generation phase sets in, to be followed by yet another mineral recovery phase. If desired several such phases of energy generation and mineral recovery may alternate with each other.

We claim:

1. A method for the generation and recovery of heat as a source of useful energy, comprising
   locating a substantially compact and impermeable subterranean formation of a calcareous rock in admixture with one or more silicate minerals capable of undergoing an accelerated enthalpic degradation,
   boring at least one bore hole leading into said formation,
   initiating a gradually proceeding, self-sustaining accelerated enthalpic degradation reaction in the bore hole which produces heat while gradually transforming the originally compact and impermeable subterranean formation into a porous structure,
   injecting water into the bore hole in direct contact with the formation undergoing enthalpic degradation, said water being converted to steam by the heat from such enthalpic degradation;
   capturing formed steam emerging from the bore hole, and recovering sensible heat therefrom.

2. A method according to claim 1 wherein the same bore hole serves for the injection of water and the withdrawal of steam.

3. A method according to claim 2 wherein substantially horizontal bore holes are associated with said bore hole extending radially therefrom in said formation.

4. A method according to claim 1, wherein after the bore hole has cooled down to the point where steam no longer emerges therefrom in any significant amount, minerals that are formed or set free during the enthalpic degradation reaction are recovered by continuing to flush the bore hole with water, withdrawing therefrom a mineral bearing aqueous phase, and subjecting such aqueous phase to operations for the recovery of minerals therefrom.

5. A method according to claim 1, comprising:
   (i) locating the subterranean formation of calcareous rock in admixture with one or more silicate minerals capable of undergoing an accelerated enthalpic degradation;
   (ii) boring at least one first bore hole leading into said formation;
   (iii) boring at least one second bore hole at a distance from said first bore hole;
   (iv) inducing the initiation of a self-sustaining accelerated enthalpic degradation via said first bore hole;
   (v) allowing the accelerated enthalpic degradation reaction to proceed until it reaches said second bore hole;
   (vi) flushing said first bore hole with water so as to cause the water to flow towards said second bore hole and to emerge therefrom in the form of steam; and
   (vii) recovering sensible heat from the steam emerging from said second bore hole.

6. A method according to claim 5 wherein minerals formed or set free during the enthalpic degradation reaction are recovered by withdrawing some of the water charged into said first bore hole in the form of a mineral bearing aqueous phase, as soon as the bottom region of said first bore hole has cooled down sufficiently, and
   subjecting the so withdrawn aqueous phase to operations for the recovery of minerals therefrom.

7. A method according to claim 5, wherein minerals formed or set free during the enthalpic degradation reaction are recovered by removing a mineral bearing aqueous phase emerging from the second bore hole and subjecting the aqueous phase to operations for the recovery of minerals therefrom.

8. A method according to claim 1 comprising recovering hydrogen from steam emerging from a bore hole.

9. A method according to claim 5 comprising recovering hydrogen from steam emerging from a bore hole.

* * * * *